United States Patent
Wild et al.

(10) Patent No.: US 6,659,091 B2
(45) Date of Patent: Dec. 9, 2003

(54) METHOD FOR COMPENSATING FOR ABNORMAL CHANGES IN THE GAS FLOW PASSING THROUGH AN EXHAUST GAS RECIRCULATION LINE OF AN INTERNAL COMBUSTION ENGINE

(75) Inventors: Ernst Wild, Oberriexingen (DE); Oliver Schlesiger, Asperg (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 09/935,822

(22) Filed: Aug. 23, 2001

(65) Prior Publication Data
US 2002/0124838 A1 Sep. 12, 2002

(30) Foreign Application Priority Data
Aug. 22, 2000 (DE) .......................... 100 41 076

(51) Int. Cl.⁷ ............................................. F02M 25/07
(52) U.S. Cl. ................. 123/568.16; 73/117.3; 73/861.61
(58) Field of Search ................... 123/568.11, 568.16, 123/568.21; 73/116, 117.3, 118.1, 118.2, 861.52, 861.61

(56) References Cited

U.S. PATENT DOCUMENTS

| | | | |
|---|---|---|---|
| 4,378,777 A | * 4/1983 | Iida et al. | 123/568.16 |
| 4,433,666 A | 2/1984 | Masaki et al. | 123/568.22 |
| 4,467,775 A | 8/1984 | Buck et al. | 123/568.27 |
| 5,154,156 A | 10/1992 | Ohuchi | 123/568.16 |
| 5,341,300 A | * 8/1994 | Fujimoto | 123/568.16 |
| 5,964,820 A | * 10/1999 | Miwa et al. | 123/568.16 |
| 6,182,644 B1 | * 2/2001 | Kotwicki et al. | 123/568.16 |
| 6,308,694 B1 | * 10/2001 | Kotwicki et al. | 123/568.16 |
| 6,401,700 B2 | * 6/2002 | Balekai et al. | 123/568.16 |
| 6,457,461 B1 | * 10/2002 | Romzek | 123/568.16 |

FOREIGN PATENT DOCUMENTS

| | | |
|---|---|---|
| DE | 197 19 278 | 11/1998 |
| DE | 197 30 973 | 3/1999 |
| EP | 0 397 360 | 11/1990 |

* cited by examiner

Primary Examiner—Willis R. Wolfe
(74) Attorney, Agent, or Firm—Kenyon & Kenyon

(57) ABSTRACT

The goal is to reliably diagnose and compensate for a change in the gas flow passing through an exhaust gas recirculation line. For this purpose, according to a first method, the mass flow passing through the exhaust gas recirculation line is derived as a function of the position and the flow characteristic of the exhaust gas recirculation valve, and, according to a second method, the mass flow is derived from the fresh-air mass flow in the induction pipe and from the induction pipe pressure. Then the difference is determined between the mass flows as ascertained in accordance with the two methods, and from the difference one or plurality of correcting quantities is generated for the mass flow that is derived as a function of the valve position and of the flow characteristic.

8 Claims, 2 Drawing Sheets

METHOD FOR COMPENSATING FOR ABNORMAL CHANGES IN THE GAS FLOW PASSING THROUGH AN EXHAUST GAS RECIRCULATION LINE OF AN INTERNAL COMBUSTION ENGINE

BACKGROUND INFORMATION

In an exhaust gas recirculation system, exhaust gas is mixed with the air-fuel mixture of an internal combustion engine. Up to a certain point, an increasing residual gas component in the air-fuel mixture can have a positive effect on energy conversion and therefore on fuel consumption. By increasing the residual gas component, the engine can be dethrottled. In this way, losses due to charge changes are reduced and efficiency is increased. In addition, an increase in the residual gas component results in a reduction in the peak temperature of the combustion process and consequently in a reduction in the formation of nitrogen oxide in the exhaust gas. Increased nitrogen oxide emissions in the exhaust gas occur predominantly in stratified engine operation at an air-fuel ratio $\lambda > 1$ in SI engines having direct fuel injection. To counteract this, in an engine having direct fuel injection, exhaust gas recirculation is vital. In this context, exhaust gas recirculation denotes a system in which an exhaust gas mass flow is drawn from the exhaust gas line of the engine and is then conveyed in a dosed manner to an exhaust gas recirculation line leading to the engine via an exhaust gas recirculation valve.

It is unavoidable that in an exhaust gas recirculation system deposits of solid material from the exhaust gas over time can clog the exhaust gas recirculation valve and the recirculation line, the volume of recirculated exhaust gas thus being reduced as the running time of the internal combustion engine increases. For this reason, the functioning of the exhaust gas recirculation system of an internal combustion engine is monitored and measures are taken which compensate for such abnormal changes in the gas flow passing through the exhaust gas recirculation line. From German Published Patent Application No. 197 19 278, a method is known which makes it possible to ascertain abnormal changes in the gas flow passing through an exhaust gas recirculation line. In this context, the lambda-control factor is calculated in a switched-on and switched-off exhaust gas recirculation system and the difference between the two control factors is compared to preestablished threshold values with regard to a positive and a negative deviation. When the difference between the lambda-control factors exceeds a threshold value, a fault in the exhaust gas recirculation system is signaled. According to this related art, a fault in the exhaust gas recirculation system is counteracted by using the difference between the lambda-control factors, in switched-on and switched-off exhaust gas recirculation systems, as a correcting quantity, e.g., for the injection time.

SUMMARY OF THE INVENTION

The present invention is based on the objective of indicating a method which can very precisely diagnose and compensate for a changed gas flow passing through an exhaust gas recirculation line.

According to the present invention, as a result of the fact that the mass flow passing through the exhaust gas recirculation line, in a first method, is derived as a function of the position and the flow characteristic of an exhaust gas recirculation valve, the mass flow passing through the exhaust gas recirculation line, in a second method, is derived from the fresh-air mass flow in the induction pipe and from the induction pipe pressure, the difference is determined between the mass flows that were ascertained in accordance with the two methods, and then, from the difference between the two mass flows, one or a plurality of correcting quantities is generated for the mass flow which was derived as a function of the valve position and the flow characteristic.

Using the method according to the present invention, it is possible to reliably detect an insufficient exhaust gas recirculation rate at which the exhaust gas threshold values prescribed by law can no longer be maintained. In addition, measures are indicated which make it possible, in a corrective manner, to take into account the detected changes in the gas flow in calculating the mass flow passing through the exhaust gas recirculation line. Using this corrected mass flow, the engine control system can counteract the exhaust gas threshold values are exceeded.

As a correcting quantity for the mass flow, it is possible to use, e.g., an offset for the flow characteristic or a factor that changes the slope in the flow characteristic. A further advantageous correcting quantity is a value that reduces the exhaust gas pressure as measured upstream of the exhaust gas recirculation valve, the value being the product of the square of the mass flow, as determined in accordance with the first method, and the difference between the two mass flows. The choice among the aforementioned correcting quantities is a function of the size of the mass flow, the offset being used correctively in response to a mass flow that is smaller than the slope change, and the reduction in the exhaust gas pressure being used in response to a mass flow that is greater than the slope change.

It is advantageous that a fault in the exhaust gas recirculation system is signaled if the difference between the mass flows determined by the two methods exceeds a preestablished threshold value.

In the event of a fault in the exhaust gas recirculation system, using the measures of the present invention, a correcting quantity is generated which exercises a direct influence on the control system of the exhaust gas recirculation valve. In contrast, in the related art (German Published Patent Application No. 197 19 278), if a fault in the exhaust gas recirculation system has been detected, other operating quantities of the engine, namely the load signal and the ignition, are corrected, i.e., quantities which do not directly relate to the exhaust gas recirculation system, the actual source of the fault.

DETAILED DESCRIPTION

Figure 1:
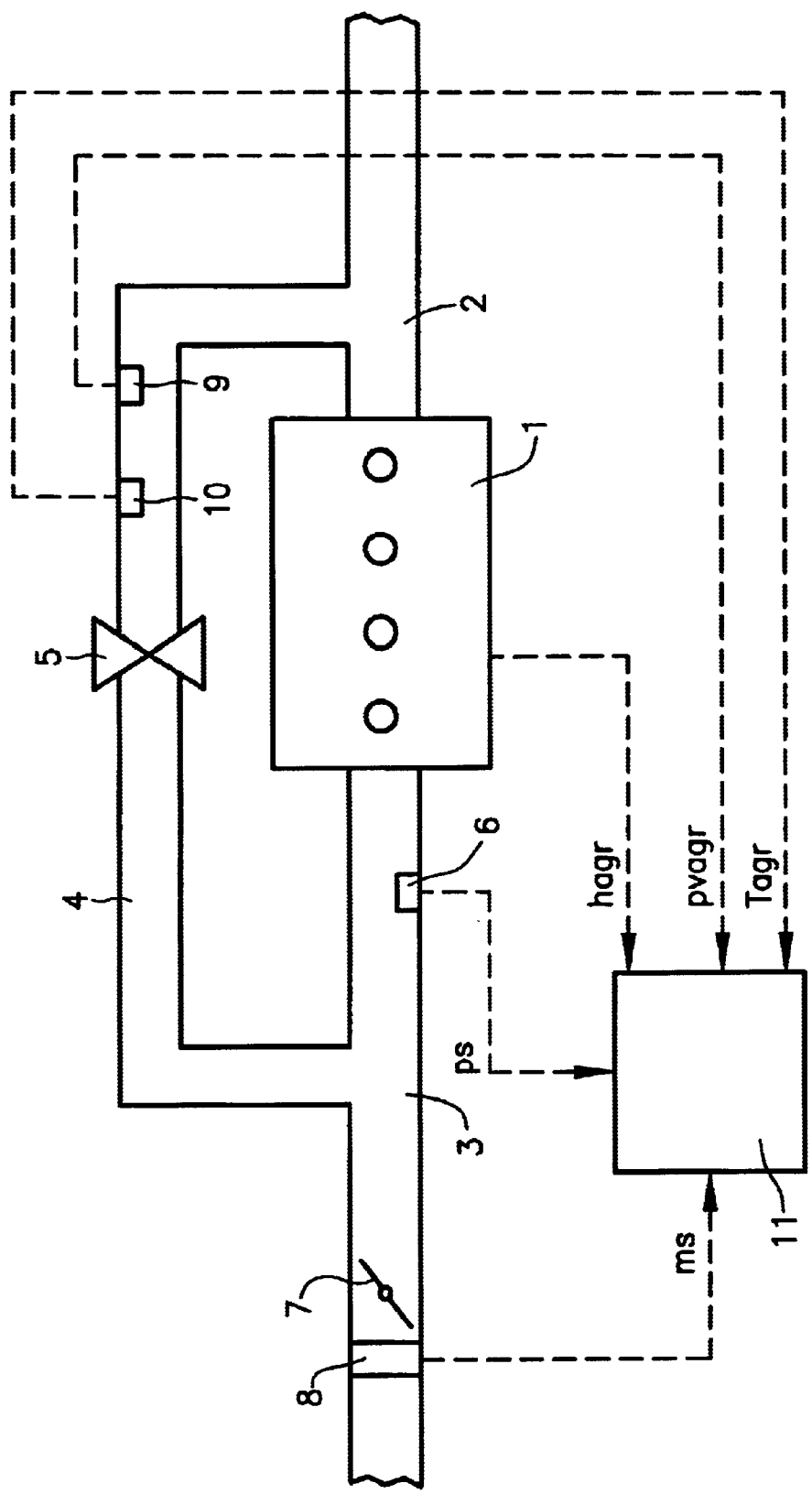
FIG. 1 depicts a schematic representation of an internal combustion engine having an exhaust gas recirculation system.

FIG. 1 schematically depicts an internal combustion engine 1 having an exhaust gas channel 2 and an induction pipe 3. From exhaust gas channel 2, exhaust gas recirculation line 4 branches off, discharging into induction pipe 3. Located in exhaust gas recirculation line 4 is a valve 5. The recirculated exhaust gas volume can be controlled by this exhaust gas recirculation valve 5. Arranged downstream of the mouth of exhaust gas recirculation line 4 in induction pipe 3 is a pressure sensor 6, which measures induction pipe pressure ps. Located upstream of the mouth of exhaust gas recirculation line 4 is a throttle valve 7, and located upstream of throttle valve 7 in induction pipe 3 is an air-flow sensor 8, which measures fresh-air mass flow ms that is sucked in. Arranged in exhaust gas recirculation line 4 upstream of exhaust gas circulation valve 5 are a pressure sensor 9, which measures exhaust gas pressure pvagr upstream of exhaust gas recirculation valve 5, and a temperature sensor 10, which measures temperature Tagr of the exhaust gas. Fresh-air mass flow ms in the induction pipe and induction pipe pressure ps can also be derived from other operating quantities of the engine using modeling calculations.

All of the above-mentioned sensor-generated quantities are supplied to a control unit 11. They include induction pipe pressure ps, fresh-air mass flow ms, exhaust gas temperature Tagr, exhaust gas pressure pvagr upstream of exhaust gas recirculation valve 5, and position hagr of exhaust gas recirculation valve 5. The manner in which control unit 11 detects and compensates for abnormal changes in the gas flow passing through exhaust gas recirculation line 4 from the aforementioned quantities is described on the basis of the flowchart depicted in FIG. 2.

To be able to detect and compensate for abnormal changes in the gas flow passing through exhaust gas recirculation line 4, which arise, e.g., as a result of deposits of solid material from the exhaust gas in valve 5 and in line 4 or as a result of manufacturing tolerances or as a result of age-related flow changes in the valve, the air mass flow passing through exhaust gas recirculation line 4 is ascertained using two different methods.

According to a first method, a mass flow msagr passing through exhaust gas recirculation line 4 is calculated in accordance with the following equation (1):

$$msagr=(MSNAGR-ofmsagr)*ftagr*pvagr/1013hPa* fkmsagr*KLAF \tag{1}$$

Figure 2:
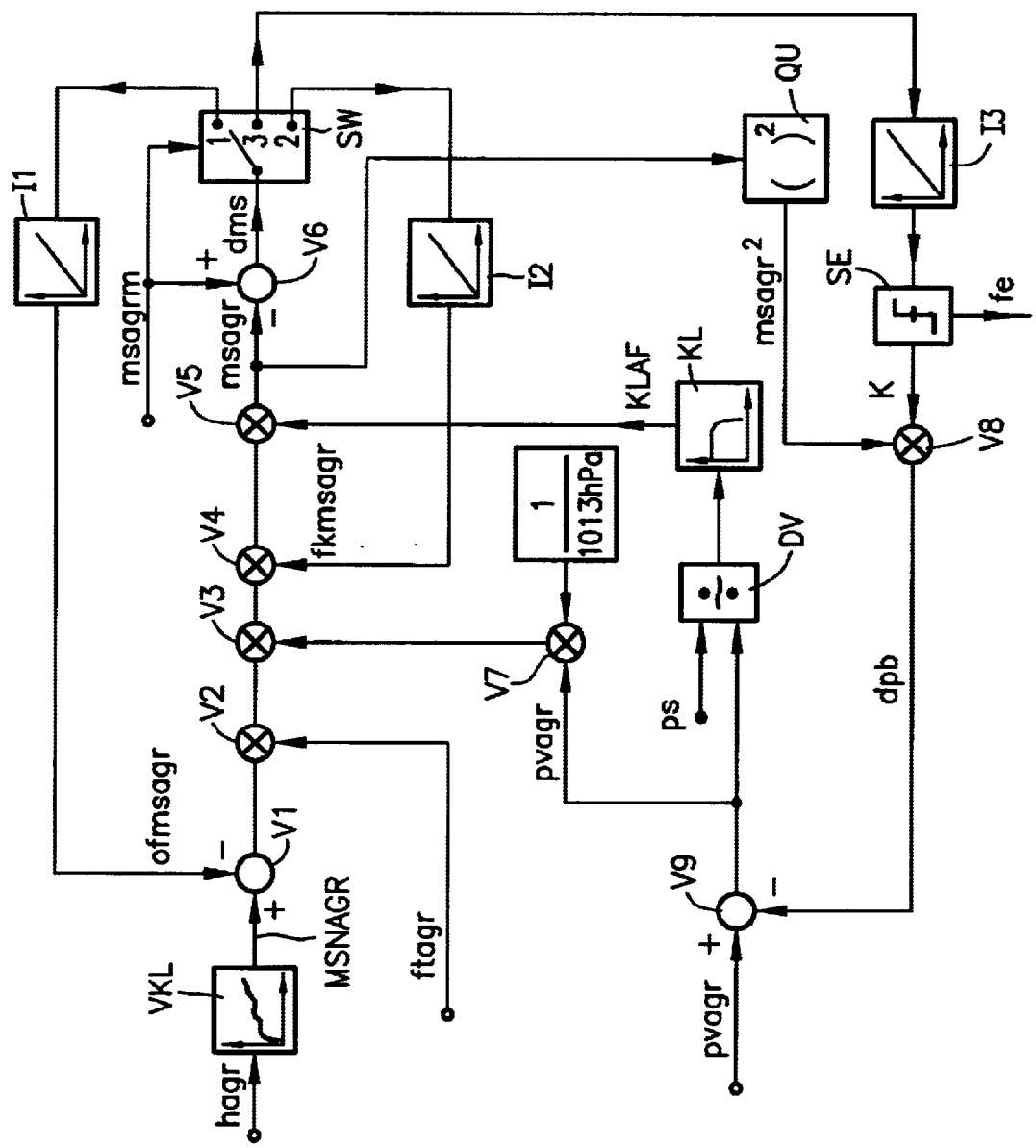
FIG. 2 depicts a flowchart for compensating for abnormal changes in the gas flow passing through an exhaust gas recirculation line.

The calculation of mass flow msagr in accordance with equation (1) is illustrated by the flowchart in FIG. 2. First, a standard mass flow MSNAGR, derived from valve characteristic VKL of exhaust gas recirculation valve 5, is determined as a function of specific valve position hagr. At a node V1, an offset value ofmsagr is subtracted from this standard mass flow MSNAGR. The difference of standard mass flow MSNAGR and offset ofmsagr is multiplied by plurality of factors at nodes V2, V3, V4, and V5. The first factor at node V2 is a temperature value ftagr, for which the following applies:

$$ftagr=\sqrt{273K/Tagr} \tag{2}$$

Therefore, this temperature value ftagr, as can be derived from equation (2), represents the temperature ratio of the standard temperature of 273 K and instantaneous gas temperature Tagr.

The factor at node V3 is the ratio, generated at node V7, of exhaust gas pressure pvagr, which is measured upstream of exhaust gas recirculation valve 5, and a standard exhaust gas pressure of 1013 hPa. At a standard exhaust gas pressure of 1013 hPa, standard mass flow MSNAGR arises, which precisely corresponds to the flow characteristic of exhaust gas recirculation valve 5, which is usually made available by the valve manufacturer and is stored in function block VKL. This flow characteristic naturally takes into account only the functioning of exhaust gas recirculation valve 5 but not the changes in the flow passing through exhaust gas recirculation valve 5 brought about by manufacturing tolerances or from other causes. To take into account abnormal changes of this type in mass flow msagr as calculated in accordance with equation (1), the changes representing deviations from the standard conditions, offset value ofmsagr, on the one hand, and a correcting term fkmsagr present at node 4, on the other hand, are provided. Correcting factor fkmsagr influences the slope of the flow characteristic.

Finally, at node 5, one additional value KLAF is present, which is derived from a characteristic KL. This value KLAF represents the flow velocity through exhaust gas recirculation valve 5 in relation to the sonic velocity. From a divider DV, the ratio of induction pipe pressure ps and exhaust gas pressure pvagr is generated upstream of exhaust gas recirculation valve 5, and factor KLAF is derived from characteristic KL as a function of this ratio. If the ratio of induction pipe pressure ps to exhaust gas pressure pvagr is smaller than 0.52, then sonic velocity ensues, and in a ratio that is greater than 0.52, the flow velocity falls below the sonic velocity. Finally, at the output of node V5, mass flow msagr is present.

According to a second method, a mass flow msagrm is derived from fresh-air mass flow ms and induction pipe pressure ps. Fresh-air mass flow ms can be measured, e.g., using a hot-film air-mass meter. By dividing fresh-air mass flow ms by engine rotational speed nmot and a constant KUMSRL, the fresh-air mass flow, in accordance with equation (3), is converted to a relative air charge rl in the combustion chamber.

$$rl=ms/(nmot*KUMSRL) \tag{3}$$

At the time point, at which the intake valve closes, there is an equality of pressure between the combustion chamber and the induction pipe. Using a factor fupsrl, which takes into account the gas temperature in response to closing the intake valve, combustion chamber pressure ps is converted to a relative total charge rf in accordance with equation (4).

$$rf=ps*fupsrl \tag{4}$$

Relative total charge rf, in accordance with equation (5), is composed of relative air charge rl in the combustion chamber, residual gas charge rfrint, which remains in the combustion chamber and is ascertained during the application, and external residual gas charge rfrex, which is supplied by the exhaust gas recirculation system.

$$rf=rl+rfrint+rfrex \tag{5}$$

External residual gas charge rfrex, which is generated by the exhaust gas recirculation system, is yielded by the equation (6):

$$rfrex=rf-rl-rfrint \tag{6}$$

According to the equation (7), mass flow msagrm is generated by multiplying external residual gas charge rfrex by rotational speed nmot and constant KUMSRL.

$$msagrm=rfrex*nmot*KUMSRL \tag{7}$$

Mass flow msagrm can also be determined in a manner different from that depicted above.

At a node V6, difference dms is determined between mass flows msagr and msagrm, which were calculated previously. From difference dms between mass flows msagr and msagrm, one or a plurality of correcting quantities ofmsagr, fkmsagr, dpb is generated for mass flow msagr, which is derived as a function of valve position hagr and flow characteristic VKL. Which of the correcting quantities is adaptively changed as a function of difference dms between mass flows msagr and msagrm depends on the size of the mass flow. Therefore, a switch SW is provided, which has a switch position 1, 2, and 3 for each of the aforementioned correcting quantities. The switch position in switch SW is controlled by the size of mass flow msagrm. If only a small mass flow msagrm exists, then switch SW is placed at a switch position 1, and difference dms between calculated mass flows msagr and msagrm is transformed by a first integrator I1 into correcting quantity ofmsagr, which causes an offset in flow characteristic VKL. If mass flow msagrm reaches a higher value, then switch SW is placed at switch position 2, so that difference dms between mass flows msagr and msagrm is transformed by a second integrator I2 into correcting quantity fkmsagr, which changes the slope of the flow characteristic.

In a mass flow msagrm which is so great that abnormal changes in the gas flow can no longer be compensated for using either of previously mentioned correcting quantities ofmsagr and fkmsagr, then switch SW is placed at switch position 3. In this case, difference dms between calculated mass flows msagr and msagrm is supplied to a third integrator I3, which generates a factor K from difference dms. At a node V8, this factor K is multiplied by square $msagr^2$, generated by a squaring element QU, of calculated mass flow msagr. The result of the product of factor K and the square of mass flow msagr is correcting quantity dpb, which, at node V9, is subtracted from measured exhaust gas pressure pvagr. Using correcting quantity dpb, it is possible to compensate for a very significant deformation of the flow characteristic due to a soiling of valve 5 or of line 4, which is not possible using offset correction ofmsagr and slope correction fkmsagr. A soiling of this type can be simulated by assuming a supplemental diaphragm upstream of exhaust gas recirculation valve 5. Due to this fictitious diaphragm, exhaust gas pressure pvagr, upstream of exhaust gas recirculation valve 5, falls by amount dpb described. Factor K of this quantity dpb is a measure for the diameter of the fictitious diaphragm in exhaust gas recirculation line 4. Exhaust gas pressure pvagr, reduced by correcting value dpb, is supplied as a factor to node V3 and is also taken into account in the formation of factor KLAF.

Factor K, derived for the formation of correcting quantity dpb from difference dms between measured mass flows msagr and msagrm, is subjected to a threshold value decision SE. If this factor K exceeds a preestablished threshold, which is equivalent to an excessive soiling of valve 5 or of exhaust gas recirculation line 4, then a fault signal fe is emitted, which signals that a fault exists in the exhaust gas recirculation system which cannot be compensated for in the manner described above.

What is claimed is:

1. A method for compensating for an abnormal change in a gas flow passing through an exhaust gas recirculation line of an internal combustion engine, comprising the steps of:
   performing a first operation to derive a first mass flow passing through the exhaust gas recirculation line as a function of a position of an exhaust gas recirculation valve and a flow characteristic of the exhaust gas recirculation valve;
   performing a second operation to derive a second mass flow passing through the exhaust gas recirculation line from a fresh-air mass flow in an induction pipe and from an induction pipe pressure;
   determining a difference between the first mass flow and the second mass flow; and
   generating from the difference at least one correcting quantity for the first mass flow.

2. The method according to claim 1, further comprising the step of:
   generating an offset for the flow characteristic as one of the at least one correcting quantity.

3. The method according to claim 1, further comprising the step of:
   generating as one of the at least one correcting quantity a factor that changes a slope of the flow characteristic.

4. The method according to claim 1, further comprising the step of:
   for a generation of the at least one correcting quantity, integrating the difference.

5. The method according to claim 1, further comprising the step of:
   signaling a fault in an exhaust gas recirculation system if the difference exceeds a preestablished threshold value.

6. The method according to claim 1, further comprising the steps of:
   generating an offset for the flow characteristic as a first one of the at least one correcting quantity;
   generating as a second one of the at least one correcting quantity a factor that achieves a change in a slope of the flow characteristic;
   generating as a third one of the at least one correcting quantity a value that reduces an exhaust gas pressure measured upstream of the exhaust gas recirculation valve, wherein:
     the value is a product of a square of the first mass flow and the difference;
   performing a selection of one of the offset, the factor, and the value, wherein:
     the selection is a function of a size of the second mass flow, and
     the offset is used correctively in response to a mass flow that is smaller than the change in the slope; and
   applying the value that reduces the exhaust gas pressure in response to a mass flow that is greater than the change in the slope.

7. The method according to claim 1, further comprising the step of:
   generating as one of the at least one correcting quantity a value that reduces an exhaust gas pressure measured upstream of the exhaust gas recirculation valve, wherein:
     the value is a product of a square of the first mass flow and the difference.

8. The method according to claim 7, further comprising the step of:
   signaling a fault in an exhaust gas recirculation system if the difference exceeds a preestablished threshold value.

* * * * *